United States Patent [19]

Sircar et al.

[11] Patent Number: 4,702,749
[45] Date of Patent: Oct. 27, 1987

[54] TECHNIQUE FOR SURFACE OXIDATION OF ACTIVATED CARBON

[75] Inventors: Shivaji Sircar, Wescosville; Timothy C. Golden, Allentown, both of Pa.

[73] Assignee: Air Products and Chemicals, Inc., Allentown, Pa.

[21] Appl. No.: 877,827

[22] Filed: Jun. 24, 1986

[51] Int. Cl.$^4$ .............................................. B01D 53/04
[52] U.S. Cl. ........................................ 55/33; 55/74; 55/387; 502/416
[58] Field of Search .............. 55/33, 35, 74; 428/445, 428/460, 461; 502/27, 416, 426

[56] References Cited

U.S. PATENT DOCUMENTS

| 2,029,966 | 2/1936 | Urbain et al. | 502/416 X |
| 2,161,710 | 6/1939 | Jaeger et al. | 502/416 X |
| 2,300,600 | 11/1942 | Steely et al. | 502/426 |
| 2,704,281 | 3/1955 | Appell | 502/27 |
| 3,923,689 | 12/1975 | Broughton et al. | 502/426 |
| 3,967,464 | 7/1976 | Cormier et al. | 62/13 |
| 4,083,940 | 4/1978 | Das | 423/461 X |
| 4,187,195 | 2/1980 | Kennedy | 502/27 X |
| 4,249,915 | 2/1981 | Sircar et al. | 55/26 |
| 4,329,158 | 5/1982 | Sircar | 55/26 |
| 4,472,178 | 9/1984 | Kumar et al. | 55/25 |
| 4,532,227 | 7/1985 | Suggitt | 502/416 X |
| 4,594,231 | 6/1986 | Nishino et al. | 502/416 X |

FOREIGN PATENT DOCUMENTS

| 32943 | 2/1984 | Japan | 502/416 |
| 68051 | 4/1985 | Japan | 502/416 |
| 2125388 | 3/1984 | United Kingdom | 502/426 |

OTHER PUBLICATIONS

Mahajan et al., "Surface-Modified Carbons for the Drying of Gas Streams," Separation Science & Technology, 17(8), pp. 1019-1025, 1982.

*Primary Examiner*—Robert Spitzer
*Attorney, Agent, or Firm*—Willard Jones, II; James C. Simmons; E. Eugene Innis

[57] ABSTRACT

A mild oxidizing acid wash of activated carbon in the presence of an oxidation catalyst produces an adsorbent, with a large carboxyl IR spectra peak, having a favorable water adsorption isotherm that can be used for both pressure swing adsorption, PSA, or thermal swing adsorption, TSA, drying of gases. The oxidation catalyst is a metal salt wherein the metal is selected from the group consisting of copper, chromium and nickel.

11 Claims, 8 Drawing Figures

WATER ADSORPTION ISOTHERMS

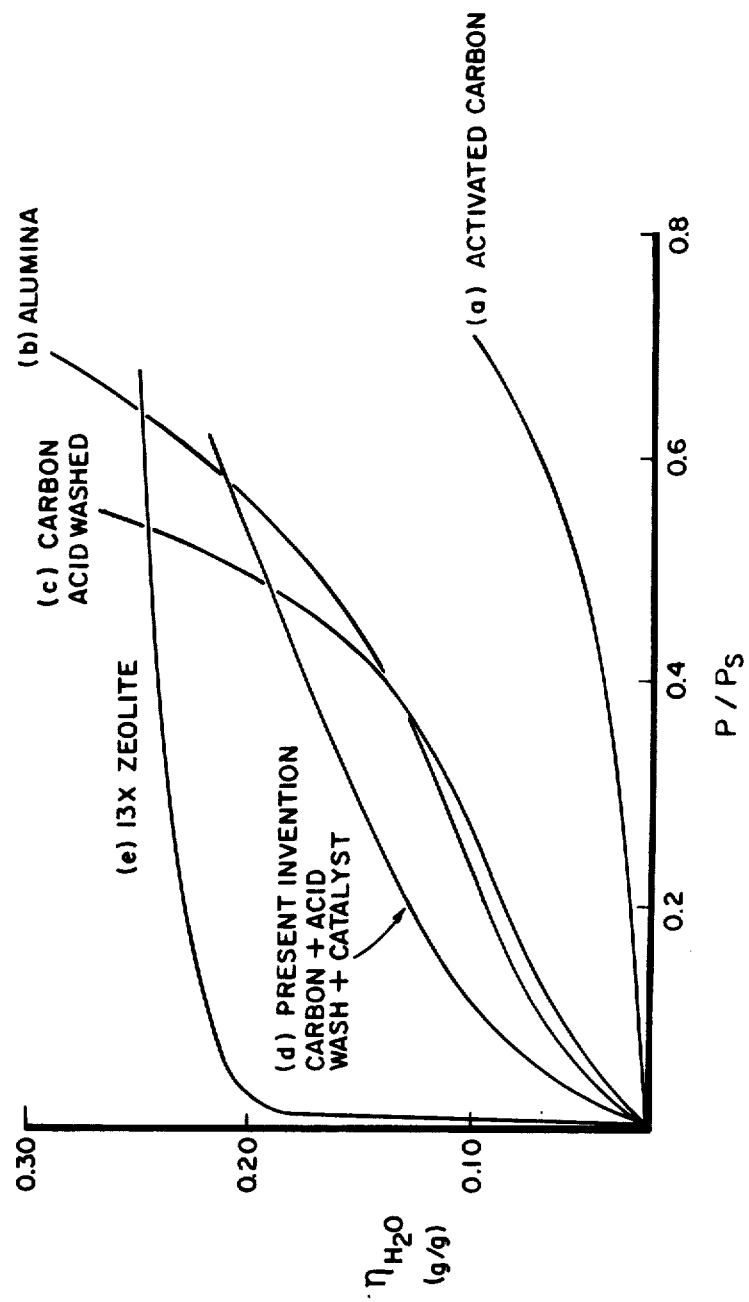

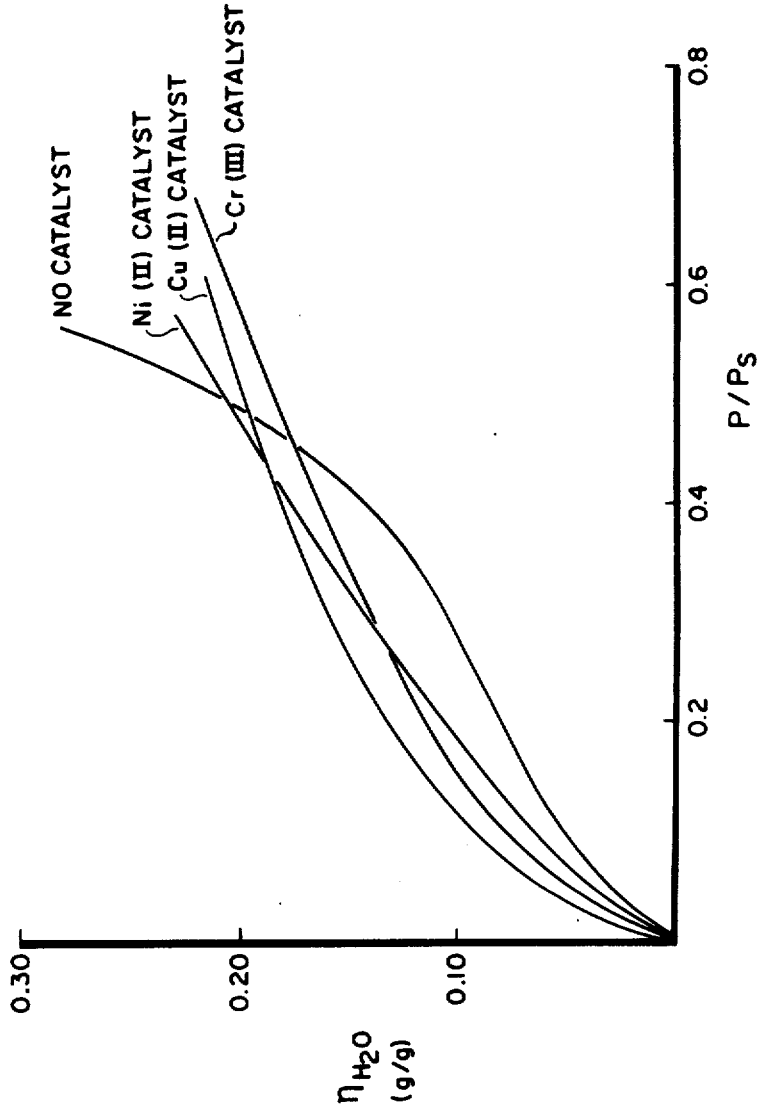
FIG. 4 H₂O ADSORPTION ISOTHERMS AT 24°C

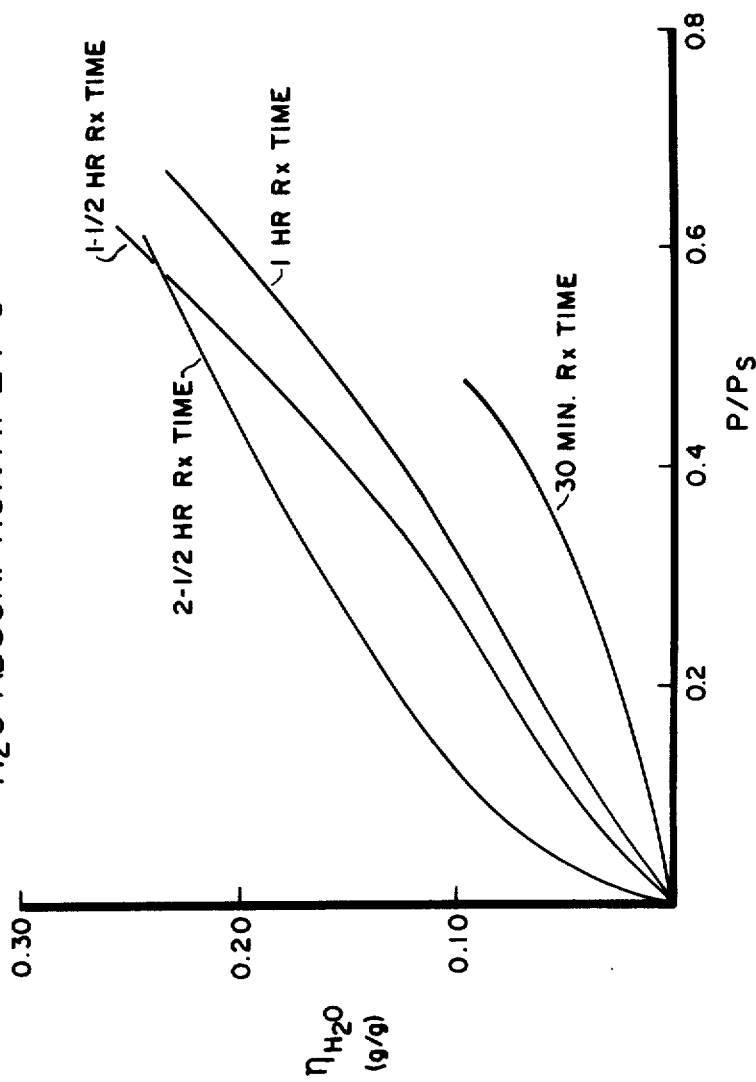

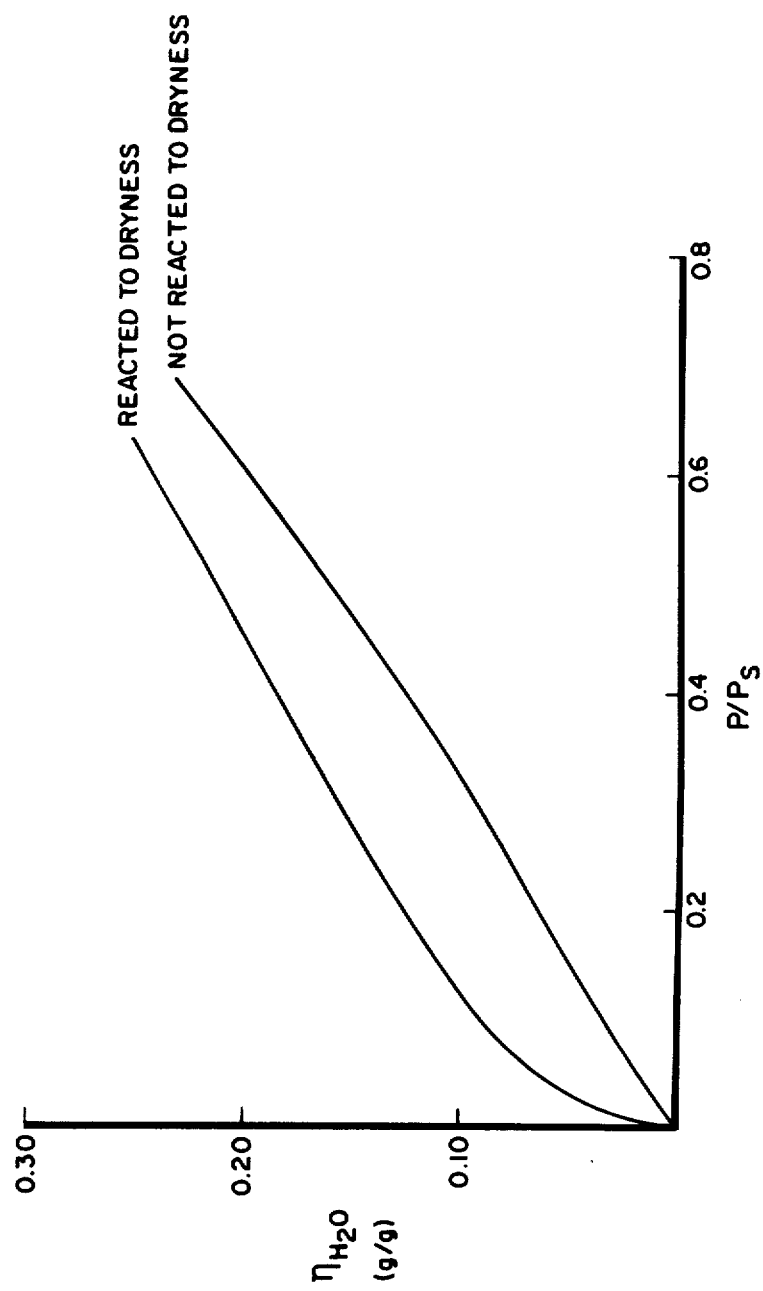

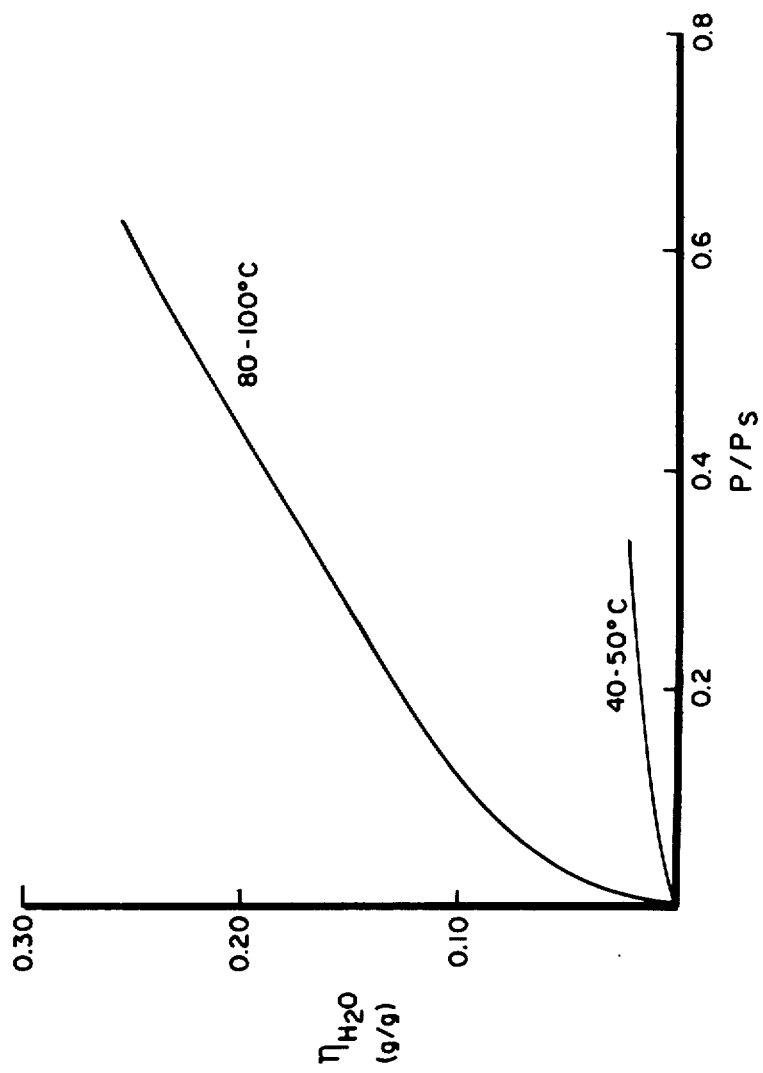

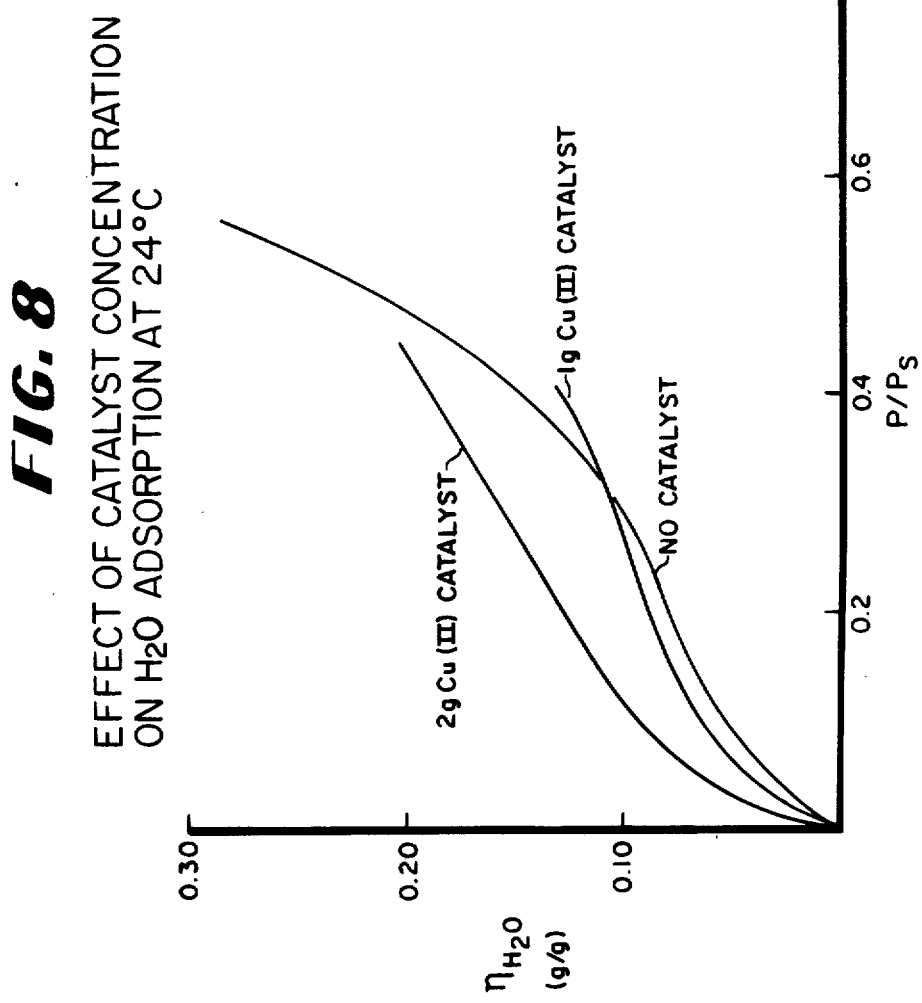

# TECHNIQUE FOR SURFACE OXIDATION OF ACTIVATED CARBON

TECHNICAL FIELD

The present invention relates to a method of activation thereby changing the water adsorption isotherm of an activated carbon and to the resultant adsorbent.

BACKGROUND OF THE INVENTION

Drying of gases by thermal swing adsorption, TSA, or pressure swing adsorption, PSA, constitute a key unit operation in the chemical industry. Examples of which are provided in U.S. Pat. Nos. 3,967,464, 4,329,158, 4,249,915 and 4,472,178, which are incorporated by reference. The performance of these driers and the energy required for drying largely depend on the properties of the absorbent used. Inorganic adsorbents like zeolites, silica gel or alumina are typically used. Zeolites used for TSA hold the water too tightly and regeneration must be carried out at high temperatures. Aluminas, on the other hand, hold water less tightly and are used for PSA drying but they do not have large water capacity at low relative humidity thus requiring large beds to contain the large water mass transfer zones exhibited by them. An ideal adsorbent for both PSA and TSA drying would be one which exhibits a water isotherm in between those of zeolites and aluminas so that both adsorbent inventory and/or energy requirement for drying can be reduced.

Very little attempt has been made to alter the adsorbent properties in the past for drying applications. Mostly, physical characteristics of zeolite pellets have been altered to give faster kinetics. It is known that the water adsorption characteristics of normally hydrophobic activated carbon can be altered by acid wash of the carbon in order to introduce surface oxide groups and make the carbon relatively more hydrophilic. One such procedure is described by Mahajan, et al. in *Separation Science and Technology* 17, page 1019 (1982) which discloses digesting activated carbon with concentrated nitric acid to obtain a carbon which has favorable water adsorption isotherms.

BRIEF SUMMARY OF THE INVENTION

The present invention relates to a carbon adsorbent for use in pressure swing adsorption and thermal swing adsorption processes and the method of activation of the carbon. In the method of activation, a commercially available activated carbon is oxidized by a mild oxidizing acid wash, preferably $HNO_3$, in the presence of a metal oxidation catalyst, preferably selected from the salts of the group consisting of copper(II), chromium(III), nickel(II) and mixtures thereof. After the activated carbon has been reacted with the mild oxidizing acid/oxidation catalyst mixture, the carbon is rinsed in water and dried.

BRIEF DESCRIPTION OF THE FIGURE

FIG. 3 is a graphical presentation of water adsorption isotherms for an activated carbon prepared by the method of the present invention and for other adsorbents.

FIG. 4 is a graphical presentation of water adsorption isotherms for activated carbons prepared by the method of the present invention utilizing different oxidation catalysts.

FIG. 5 is a graphical presentation of water adsorption isotherms for activated carbons prepared by the method of the present invention utilizing different reaction times.

FIG. 6 is a graphical presentation of water adsorption isotherms for activated carbons prepared by the method of the present invention utilizing different reaction conditions.

FIG. 7 is a graphical presentation of water adsorption isotherms for activated carbons prepared by the method of the present invention utilizing different reaction temperatures.

FIG. 8 is a graphical presentation of water adsorption isotherms for activated carbons prepared by the method of the present invention utilizing varying amounts of oxidation catalyst.

DETAILED DESCRIPTION OF THE INVENTION

Figure 1:
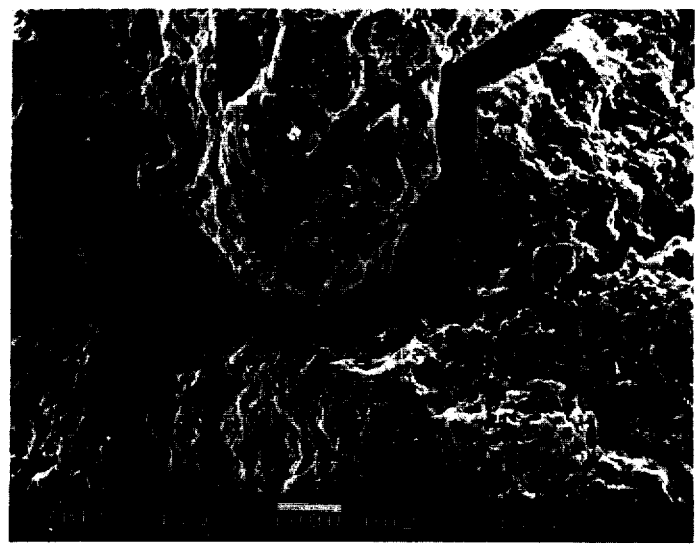
FIG. 1 is a photomicrograph of an activated carbon prepared by the strong acid method of the prior art.

PSA and TSA dryers are common in the chemical industry, typically, they employ gels or aluminas as the adsorbent. These materials, exhibit very high water capacity at larger relative humidity of water, but their capacities for water at low relative humidity are relatively small. Consequently, these materials exhibit a very long water mass transfer zone during the adsorption step. The length of the mass transfer zone depends on the shape of the isotherm in addition to the kinetics of adsorption. Linear or near linear adsorption isotherms in the low pressure (relative humidity) regions stretches the zone. The "S" shaped adsorption isotherms often exhibited by some of these materials also stretch the zone. On the other hand, linear adsorption isotherms in the low relative humidity regions, help the desorption of water by purge requiring smaller quantities of dry purge gas.

Adsorbents like zeolite hold water tightly and have large water capacities even at very low relative humidities. The adsorption isotherms in the low relative humidity region are highly nonlinear, i.e., concave toward the pressure axis. Consequently, they exhibit much smaller mass transfer zones during water adsorption, but they requie large amounts of dry purge gas during desorption.

An optimum adsorbent for PSA and TSA dyers may be a material which falls between the above two extremes. In other words, the material should have an intermediate water capacity in the low pressure region, having a nonlinear water isotherm and have relatively high water capacity at larger relative humidities. This would reduce the size of the mass transfer zone compared to the aluminas or the gels at the cost of somewhat higher purge gas requirement. This in turn would reduce the size of the adsorber for PSA drying and void losses of gas being dried during depressurization and may actually reduce the net purge gas requirements because of more efficient use of the adsorber.

Specially treated activated carbons offer the desired properties. Ordinarily activated carbons are hydrophobic, however, when the surface is oxidized by a procedure like acid wash, the carbons exhibit water adsorption isotherms which fall between those of zeolites and gels or aluminas. A judicious layering of carbon and alumina may also provide the most optimum adsorbent for the PSA dryer.

Activated carbons can also absorb dilute $CO_2$, but much less stringently than the zeolites. Consequently, such materials may also be favored in PSA dryers, where $CO_2$ removal is also demanded. One such application is pretreatment columns in PSA air separation processes. It is feasible that the carbon adsorbent, although requiring more volume than zeolite for retention of dilute $CO_2$ from air, due to its lower capacity, will need less quantity (actual volume) of dry and $CO_2$ free purge gas for its regeneration, thereby improving the efficiency of the drying/$CO_2$ removal process. Also, a layered combination of carbon for water and zeolite for $CO_2$ may be preferred.

One of the problems with digesting activated carbons with strong oxidizing acids is that it not only oxidizes the surface, but also creates meso-macropores with possible disintegration of the carbon pellet, which adversely affects the water isotherm shape. An example of such meso-macropores as shown in FIG. 1, which is a photomicrograph of a strong acid washed activated carbon. Meso-macropores may cause early condensation of water vapor before a relative humidity of 100 is reached and thus create a hysteresis loop in the isotherm during desorption by purge of pressure reduction, causing desorption to be very difficult.

Figure 2:
FIG. 2 is a photomicrograph of an activated carbon prepared by the method of the present invention.

We have found that when surface oxidation is carried with a mild oxidizing acid wash in the presence of a oxidation catalyst, a favorable water isotherm is exhibited by the carbon and the creation of meso-macropores is minimized. FIG. 2 shows the surface of an acid washed activated carbon prepared by the method of the present invention. The following acid wash procedure is given as an example of that method.

EXAMPLE I

Five grams of Ceca GE 48 activated carbon was placed in a 200 milliliter breaker. 25 ml of a 0.4 molar Cu(II) acetate, the oxidation catalyst, was added to the carbon and allowed to stand for about two minutes, to allow escape of any trapped gases. 25 ml of fuming nitric acid, i.e., about 90% volume, was added slowly to the mixture. The final $HNO_3$ concentration was 45% by volume and the final acetate concentration was 0.2 molar due to dilution. The beaker was placed on a hot plate and the mixture was reacted by gently boiling to dryness at about 80° to 100° C. for about one hour. The carbon was then washed with one liter of distilled water until the effluent pH was the same as that of the distilled water. Finally, the carbon was dried at a 110° C. for four hours.

To demonstrate the effectiveness of the above activation method, water adsorption isotherms were measured on the material prepared by the above example and for several reference materials, these water adsorption isotherms are shown in FIG. 3. These water adsorption isotherms and all others reported in this application were measured gravimetrically in a Cahn 200 microbalance. Prior to adsorption measurements, samples of about 200–300 mg were outgassed at 130° C. for 16 hours at a pressure of $4 \times 10^{-3}$ torr. Pressure measurements, up to 1 torr, were made with a MKS baratron head and pressures above 1 torr were recorded with a Heise gauge. Triply distilled water was used for adsorption measurements. Adsorption isotherm points were measured by exposing the carbon sample to a dose of water vapor at a constant temperature, 25° C. After a one hour equilibration period, the equilibrium water vapor pressure, as well as the weight increase of the adsorbent sample, were recorded. Isotherm plots of the amount adsorbed, determined by the weight increase, versus the equilibrium pressure were obtained by repeatedly carrying out this procedure. These water adsorption isotherms plot the amount of water adsorbed per unit weight of adsorbent ($\eta_{water}$) against the relative vapor pressure of water in the equilibrium vapor phase ($P/P_s$). P is the pressure of water and $P_s$ is the saturation vapor pressure of water at the measured temperature.

In FIG. 3, isotherm (a) illustrates the water adsorption characteristic of the Ceca activated carbon, without surface oxidation; this type of isotherm is typical of a hydrophobic adsorbent. For comparison, isotherm (b) and isotherm (e) show, respectively, water adsorption isotherms on alumina and 13X zeolite. Isotherm (c) demonstrates the effect of modifying the carbon by acid wash without the presence of an oxidation catalyst. Finally, isotherm (d) shows the modified carbon produced by the method described in the above example. Isotherm (d) adsorbs water less strongly than zeolite but more strongly than alumina giving very favorable adsorption characteristics which would be useful in both TSA and PSA drying.

As is evident by the adsorption isotherms in FIG. 3 and the photomicrographs of FIGS. 1 and 2, the use of the oxidation catalyst and milder acid washes appear to oxidize the carbon surface to a favorable degree without creating mesopores or damaging the carbon.

To further demonstrate the effectiveness of the present invention, the following examples are provided. In these examples, the oxidation catalyst and the reaction conditions were modified to determine operating ranges.

To determine the use of other metals than Cu(II) as oxidation catalyst for mild $HNO_3$ oxidation the following two examples are offered:

EXAMPLE II

Five grams of Ceca GE 48 activated carbon was placed in a 200 milliliter beaker. 25 ml of a 0.32 molar Cr(III) acetate was added to the carbon and let sit for about two minutes, to allow escape of any trapped gases. 25 ml of nitric acid, about 90% volume, was added slowly to the mixture. The final $HNO_3$ concentration was 45% by volume and the final acetate concentration was 0.16 molar due to dilution. The beaker was placed on a hot plate and the mixture was reacted by gently boiling to dryness of about 80° to 100° C. for about one hour. The carbon was then washed with one liter of distilled water until the effluent pH was the same as that of the distilled water. The carbon was dried at a 110° C. for four hours.

EXAMPLE III

Five grams of Ceca GE 48 activated carbon was placed in a 200 milliliter beaker. 25 ml of a 0.47 molar Ni(II) acetate was added to the carbon and let sit for about two minutes, to allow escape of any trapped gases. 25 ml of nitric acid, about 90% volume, was added slowly to the mixture. The final $HNO_3$ concentration was 45% by volume and the final acetate concentration was 0.235 molar due to dilution. The breaker was placed on a hot plate and the mixture was reacted by gently boiling to dryness at about 80° to 100° C. for about one hour. The carbon was then washed with one liter of distilled water until the effluent pH was the same as that of the distilled water. The carbon was dried at a 110° C. for four hours.

Although the above experiments were carried out using metal acetates as oxidation catalysts, other metal salts, such as formates, oxalates, nitrates, or the likes, can be used. Similarly, other oxidizing acids, e.g. perchloric, may be used. Also, the concentration of the oxidizing acid in the final reacting mixture can be between from about 20 to about 60 percent by volume, even though the experiments were carried out using only 45% $HNO_3$ by volume.

As shown in FIG. 4, Cr(III) and Ni(III) are also effective catalysts for $HNO_3$ oxidation of active carbon. The effect of Mo(V), Co(II) and Ag(I) catalysts have also been investigated; these metals were found ineffective as catalysts.

To determine the effect of reaction time in the method of the present invention, reaction times of ½, 1, 1½ and 2½ hours were tested. These tests were conducted in accordance with the procedure of Example I using a Cu(II) oxidation catalyst and reacting the mixture for one of the above stated time periods. As can be seen from the adsorption isotherms in FIG. 5, as the reaction time increases the resultant carbon demonstrates a more desirable water adsorption isotherm. It appears to be optimal when the adsorbent material is produced by boiling to dryness.

FIG. 6 shows the water adsorption isotherms at 24° C. on two active carbons which were both reacted at 80°-100° C. for one hour. In one case, the starting solution had a volume of 50 ml Cu(II) acetate and $HNO_3$ (45%) and boiled to dryness in one hour; in the second case, the starting solution had a volume of 100 ml, but reaction until dryness did not occur in the one hour time period. All other conditions are according to the procedure detailed in Example I. As shown, the reaction to dryness produced a more desirable water adsorption isotherm. IR spectra of these two samples showed that the first carbon, i.e. the one reacted to dryness, had a larger carboxyl group peak.

The effect of reaction temperature was also investigated. FIG. 7 shows the water adsorption isotherms obtained for the materials produced by reaction at 80°-100° C. for 2½ hours and by reaction at 40°-50° C. for twelve hours; all other conditions are as enumerated in Example I. From the data available, it appears that the a desirable isotherm shape requires reaction temperatures in excess of 50° C.

FIG. 8 shows the water adsorption isotherms obtained on two oxidized carbons produced with different levels of catalyst addition. Addition of 1 gram of Cu(II) acetate has little effect on the resultant water adsorption isotherm. As the catalyst addition is increased to 2 grams, a marked increase in water adsorption is noted at low pressures. Hence the amount of oxidation catalyst added influences the water adsorption characteristics of the oxidized carbon.

Finally, the amount of metal retained on the carbon surface following oxidation was investigated. This was done to insure that water adsorption occurs on the carbon surface and not on some supported copper species. If two grams of Cu(II) acetate is completely converted to CuO and the copper remains on the carbon surface, the carbon material having an initial weight of 5 grams, the copper content of the carbon would be 7 wt %. The copper content of the oxidized carbon was measured to be less than 1 wt %, this indicates that water adsorption occurs on the carbon surface and no residual oxidizing catalyst on the carbon surface is required for the treated carbon to perform. To summarize the results presented:

Cr(III) and Ni(II), in addition to Cu(II), have been found to be effective catalysts for $HNO_3$ oxidation of active carbon.

The water adsorption propensity of the oxidized carbon increases as the exposure time to the oxidizing mixture increases. Additionally, an optimum water adsorbent is obtained by boiling the reaction mixture to dryness.

Temperatures in excess of 50° C. appear to be necessary to obtain a desirable water adsorbent.

A threshold amount of catalyst must be added before beneficial water adsorption characteristics are observed.

The present invention has been described with reference to a preferred embodiment thereof. However, the embodiment should not be considered a limitation on the scope of the invention, which scope should be ascertained by the following claims.

We claim:

1. A method of activating a carbon adsorbent which comprises oxidizing the surface of said carbon adsorbent with a mild oxidizing acid in the presence of a metal oxidation catalyst at an elevated temperature and boiling the mixture of said carbon adsorbent, mild oxidizing acid and metal oxidation catalyst to dryness; then rinsing the surface oxidizing carbon adsorbent with water; and drying the rinsed surface oxidized carbon adsorbent.

2. The method of claim 1 wherein oxidation catalyst is a salt of a metal selected from the group consisting of copper(II), chromium(III), nickel(II) and mixtures thereof.

3. The method of claim 2 wherein said salt is selected from a group consisting of acetate, formate, oxalate, nitrate and mixtures thereof.

4. The method of claim 1 wherein said oxidizing acid is from about 20 to about 60 vol % nitric acid.

5. The method of claim 1 wherein said elevated temperature is in excess of 50° C.

6. An adsorbent produced by the activation of a carbon adsorbent; said activation comprising oxidizing the surface of said carbon adsorbent with a mild oxidizing acid in the presence of a metal oxidation catalyst at an elevated temperature and boiling the mixture of said carbon adsorbent, mild oxidizing acid and metal oxidation catalyst to dryness; then rinsing the surface oxidized carbon absorbent with water; and drying the rinsed surface oxidized carbon adsorbent.

7. The absorbent of claim 6 wherein said metal oxidation catalyst is a salt of a metal selected from the group consisting of copper(II), chromium(III), nickel(II) and mixtures thereof.

8. The adsorbent of claim 7 wherein said salt is an acetate.

9. The adsorbent of claim 6 wherein said mild oxidizing acid is from about 20 to about 60 vol % nitric acid.

10. The adsorbent of claim 6 wherein said elevated temperature is in excess of 50° C.

11. In a process for the removal of water or carbon dioxide from a gas stream containing water or carbon dioxide of the type wherein said gas stream containing water or carbon dioxide is contacted with a solid phase adsorbent under pressure-swing adsorption or thermal-swing adsorption processing conditions, the improvement comprising utilizing an adsorbent produced by the activation of a carbon adsorbent, said activation comprising oxidizing the surface of said carbon adsorbent with a mild oxidizing acid in the presence of a metal oxidation catalyst at an elevated temperature and boiling the mixture of said carbon adsorbent, mild oxidizing acid and metal oxidation catalyst to dryness; then rinsing the surface oxidized carbon adsorbent with water; and drying the rinsed surface oxidized carbon adsorbent.

* * * * *

UNITED STATES PATENT AND TRADEMARK OFFICE
CERTIFICATE OF CORRECTION

PATENT NO. : 4,702,749

DATED : October 27, 1987

INVENTOR(S) : Shivaji Sircar and Timothy C. Golden

It is certified that error appears in the above-identified patent and that said Letters Patent are hereby corrected as shown below:

Column 6, Line 29
    Delete "oxidizing" and substitute therefor -- oxidized --

Column 6, Line 32
    After "wherein", insert -- said metal --

Column 6, Line 39
    After "said", insert -- mild --

Signed and Sealed this

Fourteenth Day of June, 1988

Attest:

DONALD J. QUIGG

*Attesting Officer*  *Commissioner of Patents and Trademarks*